United States Patent [19]

Preedy

[11] Patent Number: 4,508,208
[45] Date of Patent: Apr. 2, 1985

[54] APPARATUS AND METHOD FOR MOVING MATERIALS

[75] Inventor: John R. Preedy, Derby, England

[73] Assignee: Thos. Hill & Company Limited, Derby, England

[21] Appl. No.: 375,259

[22] Filed: May 5, 1982

[30] Foreign Application Priority Data

May 12, 1981 [GB] United Kingdom ............... 8114464

[51] Int. Cl.³ .......................................... B65G 25/00
[52] U.S. Cl. ................................................ 198/751
[58] Field of Search .............. 198/678, 750, 751, 752, 198/759, 761, 768

[56] References Cited

U.S. PATENT DOCUMENTS 4,019,626  4/1977  Kamner ............................. 198/750

FOREIGN PATENT DOCUMENTS 5092909  2/1977  Japan ................................. 198/768

Primary Examiner—Joseph E. Valenza
Assistant Examiner—Dennis Williamson
Attorney, Agent, or Firm—Alan H. Levine

[57] ABSTRACT

A movable conveyor for advancing material placed thereon in a particular direction by moving the conveyor in forward and reverse directions and controlling said movement so that the acceleration of the conveyor in a predetermined direction causes no relative movement between the conveyor and the material whereas acceleration in the opposite direction or deceleration in the predetermined direction causes the predetermined amount of relative movement.

8 Claims, 1 Drawing Figure

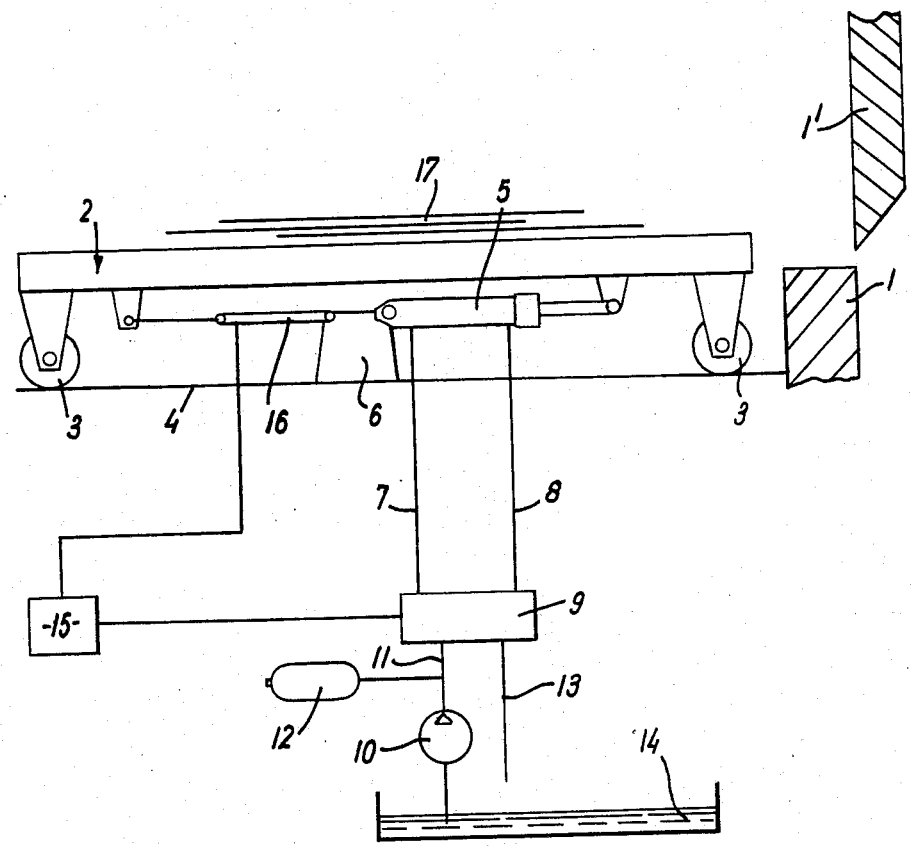

APPARATUS AND METHOD FOR MOVING MATERIALS

BACKGROUND OF THE INVENTION

This invention relates to an apparatus and method of moving materials and especially but not exclusively an apparatus and method of moving metal, for example scrap metal between the blades of a metal shearing machine.

A known and commonly used method is to oscillate a flat tray on which the material is supported, the rapid movement of which reduces the effect of friction between the tray and material carried on it. Travel can then be easily induced by, for example, inclining the tray in the required direction.

An alternative known method of causing directional travel is to arrange that the oscillation in the direction of travel is less severe than that in the reverse direction. The effect is that forward movement carries the material forward and if the reverse movement is sufficiently severe the material is not carried back, so causing a net forward movement. This effect has been achieved in the past by driving the conveyor tray by eccentric crackshafts. The oscillating conveyor, although a preferred method for moving many materials has major disadvantages. Owing to indiscriminate movement of the material caused by the oscillations the system is noisy, inefficient in energy useage, unpredictable in operation, and slow.

SUMMARY OF THE INVENTION it is an object of the present invention to obviate or mitigate these disadvantages.

According to the present invention there is provided an apparatus for moving material in a predetermined direction by a predetermined amount including a conveyor for carrying the material and means for moving the conveyor in forward and reverse directions, control means being provided for said means for moving the conveyor such that the acceleration of the conveyor in the predetermined direction causes no relative movement between the conveyor and material while acceleration in the opposite direction causes the predetermined amount of relative movement.

Preferably the means for moving the conveyor is a double acting hydraulic ram fixed at one end to the conveyor and to a fixed point at its other end such that the acceleration of the conveyor in both directions is controlled by a directional valve controlling the flow of fluid to the ram.

Preferably the movements of said valve are in turn controlled by a microcomputer of the like including a predetermined program and supplied with input signals relating to the nature of the material to be conveyed and the position of the conveyor.

The signals relating to the nature of the material may be input manually by the operator of the apparatus.

The signals relating to the conveyor position are preferably input automatically by a position transducer connected between the conveyor and a fixed point.

Preferably the directional control valve is supplied by a pumping unit and an hydraulic accumulator is included in the supply line between the valve and the said unit.

Further according to the present invention there is provided a method of causing relative movement between material and a member on which it rests by accelerating or decelerating the member at a predetermined rate whereby the frictional forces between the member and material are overcome, the value of said acceleration or deceleration being determined by noting the position of the member at intervals of time and inputting said positions to a microcomputer or the like which differentiates the position with respect to time and gives a control signal to a means for moving the member such that members' acceleration or deceleration is controlled. The microcomputer may be input with additional information relating to the co-efficient of friction between the material and the member.

BRIEF DESCRIPTION OF THE DRAWINGS

FIG. 1 is a schematic side view of the preferred embodiment.

DESCRIPTION OF THE PREFERRED EMBODIMENT

An embodiment of the present invention will now be described by way of example only with reference to the accompanying drawing which illustrates diagrammatically a material conveyor for supplying material to a shearing machine and the hydraulic circuitry for the conveyor. In this example the material to be moved is lengths of metal which are to be fed at an accurate rate into a shear 1, 1' by means of the conveyor tray 2. It is required that before each cutting cycle of the shear, the metal is conveyed forward between the blades of the shear by a regular distance. It is important that the conveying is carried out as quietly as possible. The conveyor tray 2 runs on wheels 3 on tracks 4 and an hydraulic ram 5 is attached at one of its ends to the conveyor 2 and at its other end to a fixed abutment 6 on the tracks 4. The ram 5 is fed with hydraulic oil through a pipe 7 to cause movement of the tray forwards, that is towards the shear optionally through pipe 8 to cause reverse movement. The oil flow is controlled by a variable flow hydraulic valve 9 which in turn is fed by a hydraulic pumping unit 10 through a supply line 11, an hydraulic accumulator 12 being connected into supply line 11 to absorb shock and act as a regenerative source of oil. A return line 13 carries oil released by the hydraulic valve to the oil storage tank 14 of the pumping unit 10.

The hydraulic valve 9 is controlled by output signals from a microcomputer 15 according to the predetermined control program written into its memory. Time interval is derived within the control program. A position transducer 16 arranged between the tray 2 and the abutment 6 detects the relative distance between the conveyor and the abutment 6 and signals from this transducer are fed into the microcomputer and used as input data in the program. The control programme determines acceleration by differentiating position with respect to time and the flow rate of hydraulic oil to the ram 5 is then regulated by signals from the microprocessor to the hydraulic valve 9.

Variations in type and amount of material 17 on the conveyor tray 2 are taken into account by dynamic adjustments in the control program.

In operation of the apparatus on the forward stroke oil is pumped by pump 10 through supply line 11 and directed by valve 9 under control of microprocessor 15 through line 7 to the ram 5. The acceleration is monitored by microprocessor 15 through transducer 16 and, by calculation using the program in the memory of the microprocessor, signals are sent to valve 9 to adjust it so that the acceleration of the conveyor is equal to a fraction of the valve of the coefficient of static friction between the conveyor and the transported material. During this stage line 8 exhausts oil from the ram, this oil being directed by the valve 9 through line 13 to tank 14. There will be no movement of the material relative to the tray during this movement. After a required distance of travel determined by the microprocessor the valve 9 is signalled to connect supply line 8 to line 11 and line 7 to line 13. Oil from the pump and from the ram 5 is thus directed into the accumulator 12 until the conveyor tray 2 stops. The direction of the tray 2 then reverses and oil flows from accumulator 12 into the ram through line 8 causing rapid acceleration of the tray goverened by the signals from the microcomputer 15 and the consequent setting of valve 9. This acceleration is so determined that it is greater than that of the dynamic friction between the metal 17 to be conveyed and the conveyor. Under these conditions the deceleration of the material is a sensibly constant value independent of relative velocity so that a controlled relative movement between the material and tray is achieved. On the return stroke of the cycle the position of the tray 2 is monitored by the microcomputer utilising signals from the transducer 16 and at a determined position of the tray a signal is sent to the valve 9 to connect line 11 to line 7. Oil again is forced into the accumulator 12 and the conveyor retarded until it stops at the start position. The microcomputer then signals the valve to the neutral position, in which no oil flows from the valve. If the pump is variable it can now be reduced to a zeropumping condition or alternatively, the accumulator can be continued to be charged with oil from the pump ready for use at the commencement of the next cycle.

Various modifications can be made without departing from the invention. The conveyor tray may be driven by hydraulic motors acting on its wheels or alternatively even by electric motors, although the arrangement described above is probably the most satisfactory. As a further alternative electromagnetic means could be used to advance and retract the tray. In any of these modifications, however, the position of the tray relative to the track is always monitored by a position transducer and signalled to the microcomputer such that the acceleration and deceleration of the tray is controlled as desired at all times.

As an alternative to a position transducer an acceleration transducer could be employed, whereas this could result in a simplifying of the programming of the microcomputer as it would still be essential to know the position of the tray a further position transducer would still be required.

The microcomputer could be replaced by a microprocessor or by an analogue device.

The tray could be mounted on rollers or slides and could run on slideways rather than tracks.

The accumulator could be dispensed with although its use is highly desirable as its incorporation in the circuit results in the supply of sufficient oil without the need for large hydraulic sources.

In a further modificaion decelerating forces can be utilised to cause relative displacement of the material and tray. That is the deceleration of the tray at the end of the forward stroke can be made to be so high that the material moves relative to the tray. The acceleration of the tray on the return stroke being kept sufficiently low to prevent further movement.

Whereas in the embodiment described above the apparatus includes an hydraulic pumping unit, in a modification pressurised hydraulic oil can be supplied from an external source. A further alternative is to dispense with the control valve and supply the various pressures by a variable pressure pumping means.

The apparatus described above with reference to the drawing results in movements of material over the tray which are regular and controlled. It results further in noise attenuation and reduction of losses due to non-sympathetic oscillations.

I claim:

1. Material moving apparatus including:
   a conveyor for carrying material;
   reversible hydraulic means for moving the conveyor in forward and reverse directions;
   control means for controlling the supply of operating fluid to the reversible hydraulic means;
   a position sensor for providing signals representative of the position of the conveyor with respect to a fixed point; and
   electronic processing means for receiving and storing information relevant to the material on the conveyor, and responsive to signals from said position sensor and to said information for operating the control means,
   whereby the positive or negative acceleration of the conveyor is controlled to cause, as desired, controlled relative movement between the material on the conveyor and the conveyor.

2. Apparatus for moving material in a predetermined direction by a predetermined amount including:
   a movable platform for carrying material;
   a double-acting hydraulic piston and cylinder device connected to the platform for moving the platform in forward and reverse directions;
   valve means for controlling the supply of operating fluid to the piston and cylinder device;
   a position transducer for determining the position of the conveyor at any given instant with respect to a fixed point and producing a signal corresponding to this position; and
   a computer connected to said position sensor so as to receive signals therefrom and capable of receiving and storing data relevant to the material on the platform and giving commands to the valve means in response to signals from said position sensor and said data,
   whereby the acceleration or deceleration of the conveyor is controlled to cause relative movement between the material on the conveyor and the conveyor.

3. Apparatus as claimed in claim 2, in which the computer is a microprocessor.

4. Apparatus as claimed in claim 2, in which the computer is an analogue device.

5. Apparatus as claimed in claim 2, including a pumping unit for hydraulic fluid, a supply line between said pumping unit and said valve, and an hydraulic accumulator in the supply line.

6. Apparatus as claimed in claim 2, further including an acceleration transducer for measuring the positive or negative acceleration of the platform, and transmitting an appropriate signal to the computer.

7. A method of causing relative movement between material and a conveyor upon which it rests by accelerating or decelerating the conveyor at predetermined rates whereby the frictional forces between the conveyor and the material are overcome, comprising the steps of:
- inputting to an electronic processing means information relating to the coefficient of the friction of the material on the conveyor,
- moving the conveyor and the material thereon while limiting its acceleration to a value below that which would cause relative movement between the material and the conveyor,
- bringing the conveyor to rest while controlling the rate of declaration as the material continues to move, and
- noting the position of the conveyor at intervals of time and inputting said positions to said electronic processing means which differentiates the position with respect to time, to determine the values of acceleration and deceleration of the conveyor, and issues a command signal to a means for moving the member.

8. A method of causing relative movement between material and a conveyor upon which it rests by accelerating or decelerating the conveyor at predetermined rates whereby the frictional forces between the conveyor and the material are overcome, comprising the steps of:
- inputting to an electronic processing means information relating to the coefficient of the friction of the material on the conveyor,
- moving the conveyor and the material thereon at a rate of acceleration above that which causes relative movement between the material and the conveyor,
- bringing the conveyor to rest while limiting the rate of deceleration to a value below that which will cause further relative movement between the material and the conveyor, and
- noting the position of the conveyor at intervals of time and inputting said positions to said electronic processing means which differentiates the position with respect to time to determine the values of acceleration and deceleration of the conveyor, and issues a command signal to a means for moving the member.

* * * * *